(12) United States Patent
Bauer et al.

(10) Patent No.: US 8,768,412 B2
(45) Date of Patent: *Jul. 1, 2014

(54) EXTENSIBLE INFOTAINMENT/TELEMATICS SYSTEM HAVING FIXED BASE UNIT CONTROL OF A PORTABLE COMMUNICATION DEVICE

(75) Inventors: Lee Bauer, Grosse Pointe Farms, MI (US); Erich Geiger, Kämpfelbach (DE)

(73) Assignees: Harman International Industries, Incorporated, Stamford, CT (US); Harman Becker Automotive Systems GmbH, Stamford, CT (US)

( * ) Notice: Subject to any disclaimer, the term of this patent is extended or adjusted under 35 U.S.C. 154(b) by 1195 days.

This patent is subject to a terminal disclaimer.

(21) Appl. No.: 12/026,253

(22) Filed: Feb. 5, 2008

(65) Prior Publication Data

US 2008/0261644 A1 Oct. 23, 2008
US 2013/0331142 A9 Dec. 12, 2013

Related U.S. Application Data

(63) Continuation of application No. PCT/US2007/080531, filed on Oct. 5, 2007.

(60) Provisional application No. 60/850,226, filed on Oct. 5, 2006.

(30) Foreign Application Priority Data

Oct. 6, 2006 (EP) ..................................... 06021021

(51) Int. Cl.
| | | |
|---|---|---|
| *H04M 1/00* | (2006.01) | |
| *H04N 21/41* | (2011.01) | |
| *B60R 11/02* | (2006.01) | |
| *H04N 21/4363* | (2011.01) | |
| *G01C 21/36* | (2006.01) | |
| *H04N 21/414* | (2011.01) | |
| *H04M 1/60* | (2006.01) | |
| *H04B 1/20* | (2006.01) | |
| *H04N 21/442* | (2011.01) | |
| *H04N 7/16* | (2011.01) | |
| *B60R 11/00* | (2006.01) | |

(52) U.S. Cl.
CPC ........... *H04B 1/202* (2013.01); *H04N 21/4126* (2013.01); *B60R 11/0258* (2013.01); *H04N 21/43637* (2013.01); *G01C 21/3667* (2013.01); *H04N 21/41422* (2013.01); *G01C 21/3629* (2013.01); *H04M 1/6075* (2013.01); *B60R 2011/0078* (2013.01); *H04N 21/44227* (2013.01); *B60R 11/02* (2013.01); *H04N 7/163* (2013.01); *H04M 1/6091* (2013.01)
USPC .................. 455/556.1; 455/550.1; 455/569.1; 455/569.2

(58) Field of Classification Search
USPC ....................... 455/556.1, 550.1, 569.1, 569.2
See application file for complete search history.

(56) References Cited

U.S. PATENT DOCUMENTS

| | | | |
|---|---|---|---|
| 5,859,628 A | 1/1999 | Ross et al. ..................... 345/173 |
| 6,553,308 B1 | 4/2003 | Uhlmann et al. ............. 701/208 |
| 6,714,844 B1 | 3/2004 | Dauner et al. ..................... 701/1 |
| 7,542,832 B2 | 6/2009 | Nou ................................ 701/29 |
| 2001/0027376 A1 | 10/2001 | Tiede et al. .................... 701/209 |
| 2003/0009280 A1 | 1/2003 | Hagebarth .................... 701/209 |
| 2004/0030460 A1 | 2/2004 | Bergmann et al. ................ 701/1 |
| 2004/0185855 A1 | 9/2004 | Storm et al. .................. 455/455 |
| 2004/0204069 A1* | 10/2004 | Cui et al. ...................... 455/557 |
| 2005/0130723 A1 | 6/2005 | Grivas et al. ............... 455/575.9 |
| 2005/0266879 A1 | 12/2005 | Spaur et al. ................. 455/556.2 |
| 2008/0126661 A1 | 5/2008 | Lin et al. ...................... 710/304 |
| 2008/0246850 A1 | 10/2008 | Marlowe .................... 348/222.1 |
| 2008/0248742 A1 | 10/2008 | Bauer et al. .................. 455/3.09 |
| 2008/0261644 A1 | 10/2008 | Bauer et al. .................... 455/517 |
| 2008/0278343 A1 | 11/2008 | Bauer et al. ............. 340/870.01 |

FOREIGN PATENT DOCUMENTS

| | | |
|---|---|---|
| EP | 1 473 913 A1 | 11/2004 |
| EP | 1 559 995 A1 | 8/2005 |
| EP | 1559995 A1 * | 8/2005 |
| EP | 1672940 | 6/2006 |

OTHER PUBLICATIONS

Translation of EP 1,559,995.*
Office Action, dated Jul. 11, 2013, pp. 1-16, U.S. Appl. No. 12/025,474, U.S. Patent and Trademark Office, Virginia.
Office Action, dated Nov. 21, 2012, pp. 1-15, U.S. Appl. No. 12/016,623, U.S. Patent and Trademark Office, Virginia.
Office Action, dated Nov. 12, 2010, pp. 1-11, U.S. Appl. No. 12/016,623, U.S, Patent and Trademark Office, Virginia.
Office Action, dated Oct. 13, 2011, pp. 1-13, U.S. Appl. No. 12/016,623, U.S. Patent and Trademark Office, Virginia.
Office Action, dated Sep. 28, 2010, pp. 1-18, U.S. Appl. No. 12/025,474, U.S. Patent and Trademark Office, Virginia.
Office Action, dated Mar. 22, 2011, pp. 1-19, U.S. Appl. No. 12/025,474, U.S. Patent and Trademark Office, Virginia.
Office Action, dated Feb. 21, 2013, pp. 1-20, U.S. Appl. No. 12/025,474, U.S. Patent and Trademark Office, Virginia.
Office Action, dated Apr. 14, 2011, pp. 1-25, U.S. Appl. No. 12/027,040, U.S. Patent and Trademark Office, Virginia.
Office Action, dated Sep. 22, 2010, pp. 1-23, U.S. Appl. No. 12/027,040, U.S. Patent and Trademark Office, Virginia.
Office Action, dated Mar. 13, 2013, pp. 1-24, U.S. Appl. No. 12/027,040, U.S. Patent and Trademark Office, Virginia.
International Preliminary Report on Patentability Chapter I (IB/373), dated Apr. 7, 2009, pp. 1-10, International Application No. PCT/US2007/080531.
Notice of Allowance, dated May 24, 2013, pp. 1-9, U.S. Appl. No. 12/016,623, U.S. Patent and Trademark Office, Virginia.

* cited by examiner

*Primary Examiner* — Fayyaz Alam
(74) *Attorney, Agent, or Firm* — Alleman Hall McCoy Russell & Tuttle LLP

(57) ABSTRACT

An infotainment/telematics system includes a fixed base unit adapted to execute a set of stand-alone infotainment and/or telematics functions, and a portable communication device adapted to execute a stand-alone infotainment and/or telematics function. The fixed base unit and the portable communication device may be connected for intelligent communication with one another to allow the fixed base unit to control and access the stand-alone infotainment and/or telematics function of the portable communication device.

29 Claims, 14 Drawing Sheets

EXTENSIBLE INFOTAINMENT/TELEMATICS SYSTEM HAVING FIXED BASE UNIT CONTROL OF A PORTABLE COMMUNICATION DEVICE

PRIORITY CLAIM

This application is a continuation of PCT Application Serial No. PCT/US2007/080531, filed Oct. 5, 2007, which claims the benefit of priority to European Patent Application No. 06021021.8 filed Oct. 6, 2006 and U.S. Provisional Application No. 60/850,226, filed Oct. 5, 2006, all of which are incorporated by reference herein.

BACKGROUND OF THE INVENTION

1. Technical Field

The present invention relates to an infotainment and/or telematics system in which the functionality of a fixed base unit is extensible and/or upgradable when integrated with one or more personal communication devices.

2. Related Art

Infotainment/telematics systems are used in a wide range of environments, including home systems, vehicle systems, and other environments in which individuals are subject to visual and/or audio stimuli. Such systems may provide video and/or audio entertainment and/or information to the individuals in the environment from multiple media and/or information sources. Media sources may include media files on optical storage (i.e., CD players, DVD players, and other optical formats), FLASH memory storage (i.e., USB memory, memory stick storage, and other non-volatile memory storage), disk drive storage, server-based storage, and other media storage.

The technology used in infotainment/telematics systems may change rapidly over a short period of time. Infotainment/telematics systems, such as those installed in a vehicle, may include technology current with the time at which the vehicle is manufactured. That technology may become old or obsolete not long after the vehicles are purchased. Further, certain infotainment/telematics system functionality, although existing at the time that the vehicle was manufactured, may not be made available by the manufacturer until subsequent versions of the infotainment/telematics system.

A mismatch may exist between the lifecycle of a vehicle that is used for ten or more years and the innovation cycle of the infotainment/telematics system used in the vehicle. Such a mismatch may also result in a rapid obsolescence of a set of fixed components of an infotainment/telematics system.

SUMMARY

An infotainment/telematics system includes a fixed base unit adapted to execute a set of stand-alone infotainment and/or telematics functions, and a portable communication device adapted to execute a stand-alone infotainment and/or telematics function. The fixed base unit and the portable communication device may be connected for intelligent communication with one another to allow the fixed base unit to control and access the stand-alone infotainment and/or telematics function of the portable communication device.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
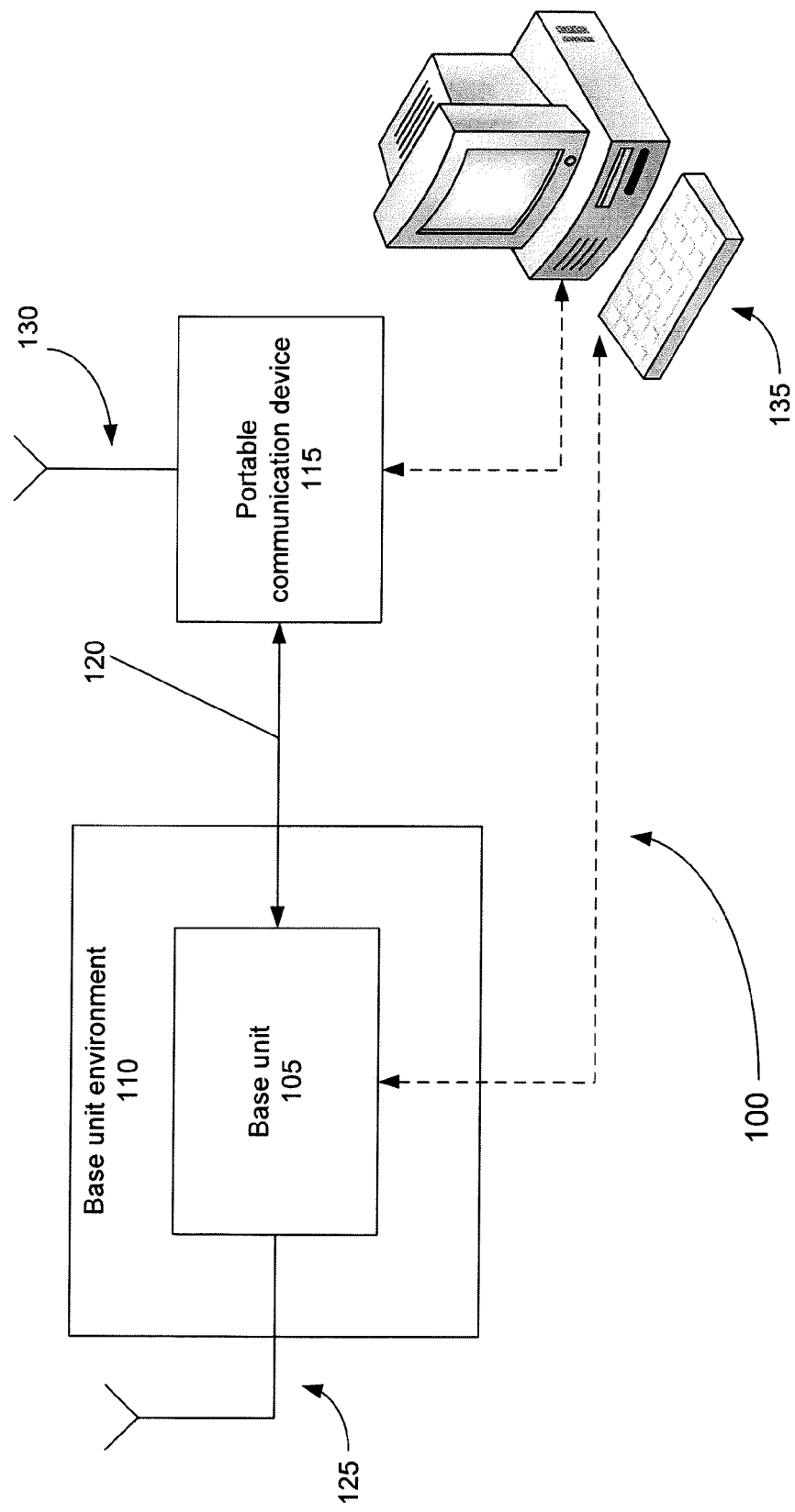
FIG. 1 is a block diagram of an extensible infotainment/telematics system.

FIG. 1 is a block diagram of an extensible infotainment and/or telematics system 100. The system 100 includes a base unit 105 that is fixed within a base unit environment 110. The base unit environment 110 may be a vehicle, a home, or other user environment capable of accommodating the fixed base unit 105. The base unit 105 may be capable of executing a first set of infotainment and/or telematics functions.

The infotainment/telematics system 100 may also include a portable communication device 115. The portable communication device 115 may be capable of executing a second set of infotainment and/or telematics functions. There may be a non-overlap between the first and second set of infotainment/ telematics function types so that the infotainment/telematics functionality of the portable communication device 115 is at least partially complementary to the infotainment/telematics functionality of the fixed base unit 105 and/or vice versa. Alternatively, the first and second set of infotainment/ telematics function types may be the same.

The fixed base unit 105 and the portable communication device 115 may be connected for intelligent communication with one another over a communication link 120. The communication link 120 may be a wireless link, a wired link, a network link, and/or other communication medium capable of sustaining intelligent communication. The intelligent communication between the fixed base unit 105 and the portable communication device 115 may be used to extend the infotainment and/or telematics functionality of one or both of the fixed base unit 105 and portable communication device 115 to include one or more of the non-overlapping infotainment/ telematics functions. Additionally, or in the alternative, the fixed base unit 105 may control infotainment and/or telematics functionality of devices on the portable communication device 115, and vice versa, when the fixed base unit 105 and portable communication devices 115 are connected for intelligent communication with one another. In such instances, the portable communication device 115 may operate as a master device with the fixed base unit 105 as a slave device in connection with certain infotainment and/or telematics functionality. Similarly, the fixed base unit 105 may operate as the master device with the portable communication device 115 as the slave device in connection with certain infotainment and/ or telematics functionality.

Either or both of the base unit 105 and/or portable communication device 115 may be updated in any of a number of different manners. For example, one or both of the base unit 105 and/or portable communication device 115 may include connections 125 and 130 for access to a Wi-Fi network that may be used to update the respective unit. Additionally, or in the alternative, one or both of the base unit 105 and/or portable communication device 115 may be updated using a corresponding link to a computer 135. Still further, the base unit 105 and/or portable communication device 115 may be updated by the other device or unit when they are connected for communication with one another.

Figure 2:
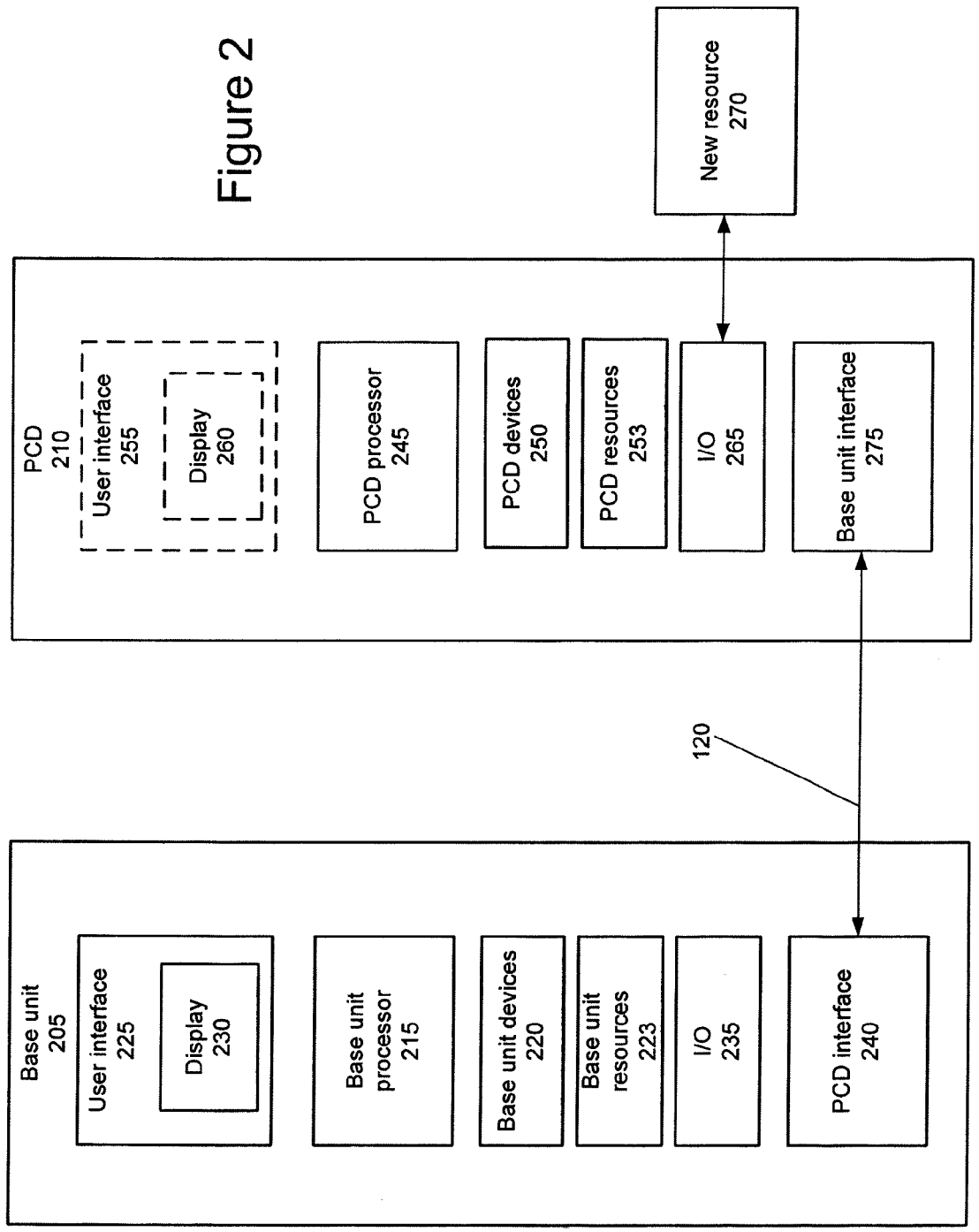
FIG. 2 is a block diagram of a base unit and portable communication device that may be used in the system of FIG. 1.

FIG. 2 is a block diagram of a base unit 205 and portable communication device 210 that may be used in the system 100 of FIG. 1. In FIG. 2, the base unit 205 includes a base unit processor 215, a plurality of base unit devices 220, and a plurality of base unit resources 223. The base unit processor 215 and the base unit devices 220 may cooperate with one another to execute the first set of infotainment and/or telematics functions associated with the base unit 205. Similarly, the base unit processor 215 and the base unit resources 223 may cooperate with one another to execute some of the first set of infotainment and/or telematics functions associated with the base unit 205. User access to the first set of infotainment and/or telematics functions may be provided through a user interface 225. The user interface 225 may be controlled by the base unit processor 215 and corresponding user interface software stored in memory of the base unit 205.

The user interface 225 may include virtual buttons, mechanical buttons, virtual and/or mechanical rotary controls, virtual and/or mechanical sliders, and/or a display 230. Display 230 may be used to provide visual feedback to the user, implement virtual controls, and/or may be included as one of the base unit devices 220 available in the base unit 205. Additionally, or alternatively, the user interface 225 may include components used to audibly interact with the base unit 205. Audible interaction facilitates use of speech commands and feedback through the user interface 225. Video components, such as a camera and/or video screen, may be used in the user interface to visually interact with the base unit 205.

Base unit 205 may also include input/output components 235. The I/O components 235 may be used for a number of different purposes. Wi-Fi updates to the software and/or firmware used by the base unit 205 may be provided to the base unit 205 using the I/O components 235. Updates may also be provided to the base unit 205 from computer 135 using the I/O components 235. Further base unit resources and resource add-ons may also be connected to the base unit 205 through the I/O components 235.

A PCD interface 240 may be provided to facilitate intelligent communication over communication link 120. The PCD interface 240 may be controlled by the base unit processor 215 and corresponding communication software. Alternatively, or in addition, the PCD interface 240 may include its own processor and corresponding communication software that controls communications between the portable communication device 210 and the base unit processor 215.

In FIG. 2, the portable communication device 210 includes a PCD processor 215, PCD devices 250, and PCD resources 253. The PCD processor 245 and the PCD devices 250 may cooperate with one another to execute the second set of infotainment and/or telematics functions associated with the portable communication device 210.

User access to the second set of infotainment and/or telematics functions may be provided through a user interface 255. The user interface 255 may be controlled by the PCD processor 245 and corresponding user interface software stored in portable communication device 210. The processing power/capability of the portable communication device 210 may exceed that of the fixed base unit 205. In such situations, the overall processing power/capability of system 100 may be increased by adding a portable communication device 210 or replacing an obsolete portable communication device with a new one.

The user interface 255 may optionally include virtual buttons, mechanical buttons, virtual and/or mechanical rotary controls, virtual and/or mechanical sliders, and/or a display 260 disposed on the personal communication device 210. Display 260 may be used to provide visual feedback to the user, implement virtual controls, and/or may be included as one of the base unit devices 250 available in the portable communication device 210. Additionally, or alternatively, the user interface 255 may include components used to audibly interact with the portable communication device 210. Audible interaction facilitates use of speech commands and feedback through the user interface 255. Video components, such as a camera and/or video screen, may be used in the user interface to visually interact with the portable communication device 210.

Portable communication device 210 may also include input/output (I/O) components 265. The I/O components 265 may be used for a number of different purposes. Wi-Fi updates to the firmware and/or software used by the portable communication device 210 may be provided to the portable communication device 210 using the I/O components 265. Updates may also be provided to the portable communication device 210 from computer 135 using the I/O components 265. New PCD resources 270 and resource add-ons may also be connected to the portable communication device 210 through the I/O components 265.

A base unit interface 275 is provided to facilitate intelligent communication with the base unit 205 over communication link 120. The base unit interface 275 may be controlled by the PCD processor 245 and corresponding communication software. Alternatively, or in addition, the base unit interface 275 may include its own processor and corresponding communication software that controls communications between the base unit 205 and the PCD processor 245.

Figure 3:
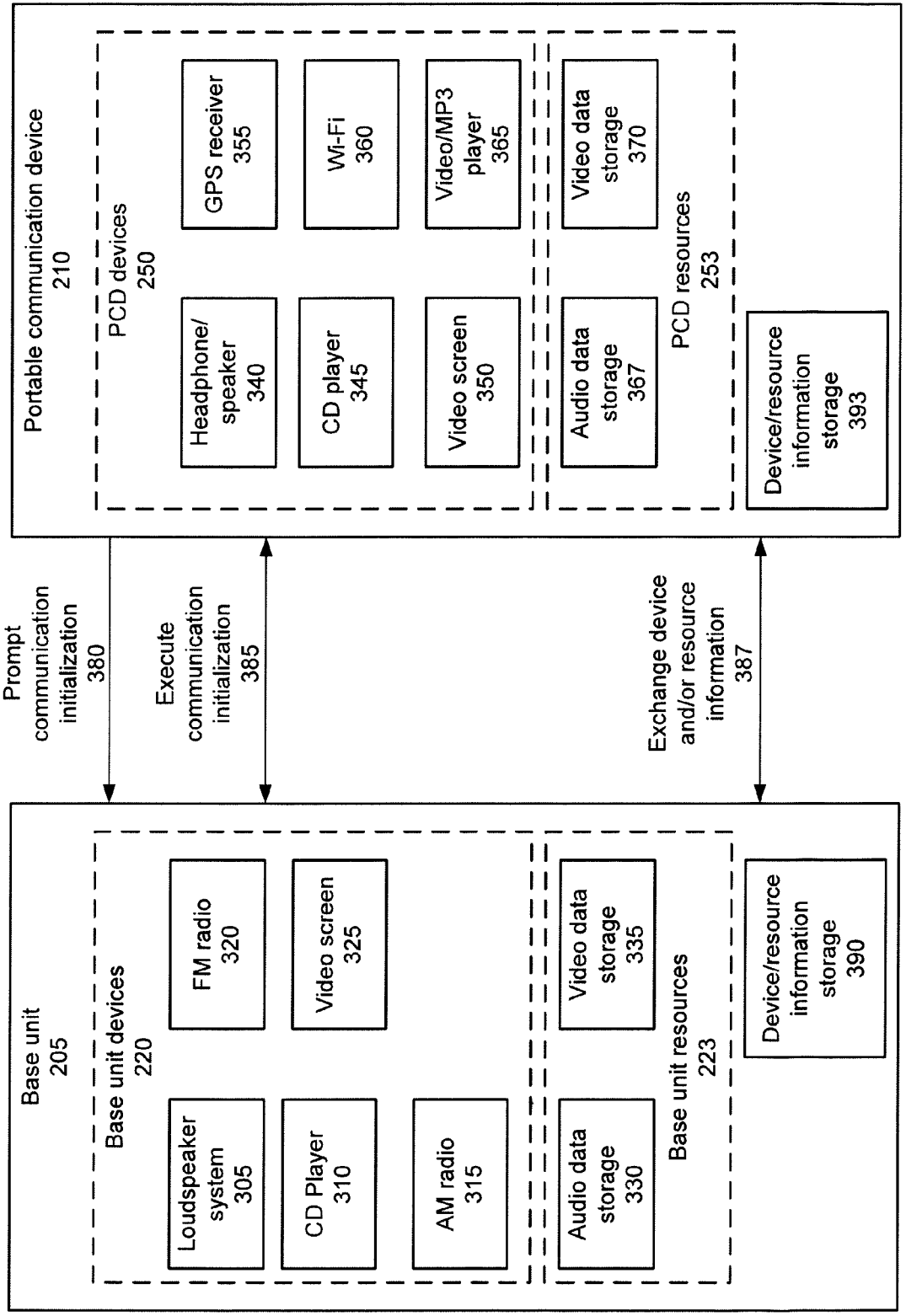
FIG. 3 shows messages that may be communicated between the base unit and portable communication device when they are connected for intelligent communication with one another.

The base unit 205 may operate as a stand-alone unit when it is not connected for intelligent communication with the portable communication device 210. When disconnected, the base unit 205 supports the infotainment/telematics functionality associated with the base unit devices 220 through the user interface 225. A set of base unit devices 220 is shown in FIG. 3 and includes: a loudspeaker system 305, a CD player 310, an AM radio 315, an FM radio 320, and a video screen 335. Further support of the infotainment/telematics functionality may be provided by the base unit resources 223, shown here as audio data storage 330 and video data storage 335.

Similarly, certain portable communication devices 210 may operate in a stand-alone manner when disconnected from the base unit 205. In such instances, the portable communication device may support the infotainment/telematics functionality associated with the PCD devices 250 through the user interface 255. A set of PCD devices 250 is shown in FIG. 3 and includes: a headphone/speaker system 340, a CD player 345, a video screen 350, a GPS receiver 355, a Wi-Fi transceiver 360, video and an MP3 player 365. Sharing of the Wi-Fi transceiver 360 allows the base unit 205 and/or portable communication device 210 to access the Internet via a hotspot. Additionally, or alternatively, such sharing allows the base unit 205 to access the portable communication device 210 via Wi-Fi or BT transceiver to use a WAN device on the portable communication device 210 as an Internet gateway to access the internet, to read e-mail, to execute Internet calling, and/or to execute other Internet-related functionality. Further support of the infotainment/telematics functionality of the portable communication device 210 may be provided by the PCD resources 253, shown here as audio data storage 367 and video data storage 370.

FIG. 3 also shows messages that may be communicated between the base unit 205 and portable communication device 210 when they are connected for intelligent communication with one another. At 380, the portable communication device 210 prompts the base unit 205 to begin executing a communication initialization process. Alternatively, or in addition, the base unit 205 may execute the prompt. Information used to initialize communications between the base unit 205 and portable communication device 210 is exchanged at 385.

At 387, the base unit 205 and portable communication device 210 exchange information regarding their respective devices and/or resources. Information relating to the devices 220 of the base unit 205 may be stored in device/resource information storage 390 while information relating to the devices 250 of the portable communication device 210 may be stored in device/resource information storage 393. Prior to the exchange of resource information 387, the resource information storage 390 does not necessarily include information associated with the devices 250. Likewise, resource information storage 393 does not necessarily include information associated with devices 220 prior to the exchange of resource information 387. During the exchange of device/resource information at 387, the base unit 205 may communicate some or all of the information in the device/resource information storage 390 to the portable communication device 210. The portable communication device 210, in turn, may communicate some or all of the information in the device/resource information storage 393 to the portable communication device 210 during: the exchange of device/resource information at 387. After the exchange of data and/or resource information at 387, the data/resource information storage 390 may include information relating to devices 220 and 250 and to resources 223 and 253. Device/resource information storage 393 may include information relating to devices 220 and 250 and to resources 223 and 253 after the exchange at 387.

Alternatively, or in addition, the exchange of device and/or resource information at 387 may be based on real-time polling/discovery of the devices 220 by the base unit 205 and by real-time polling/discovery of devices 250 by the portable communication device 210. This may be achieved, for example, through ad-hoc networking. As each device and/or group of devices 220 is polled/discovered, information corresponding to the device and/or group of devices 220 may be communicated by the base unit 205 to the portable communication device 210. Likewise, as each device and/or group of devices 250 is polled/discovered, information corresponding to the device and/or group of devices 250 may be communicated by the portable communication device 210 to the base unit 205. Discovery of resources 223 and 253 may proceed in a similar manner. Other manners of exchanging device and/or resource information may also be used.

Once a base unit 205 and portable communication device 210 have been connected with one another, they each may store information relating to the devices and/or resources of the other. In this manner, reinitiating an exchange of device/resource information between a previously paired base unit 205 and portable communication device 210 may be limited to new transient devices that are connected to either one. Alternatively, no further device/resource information exchange is necessary when neither the base units 205 nor portable communication device 210 is configured to accept new transient devices. If pairing is not desired, a complete exchange of device/resource information may be undertaken.

Figure 4:
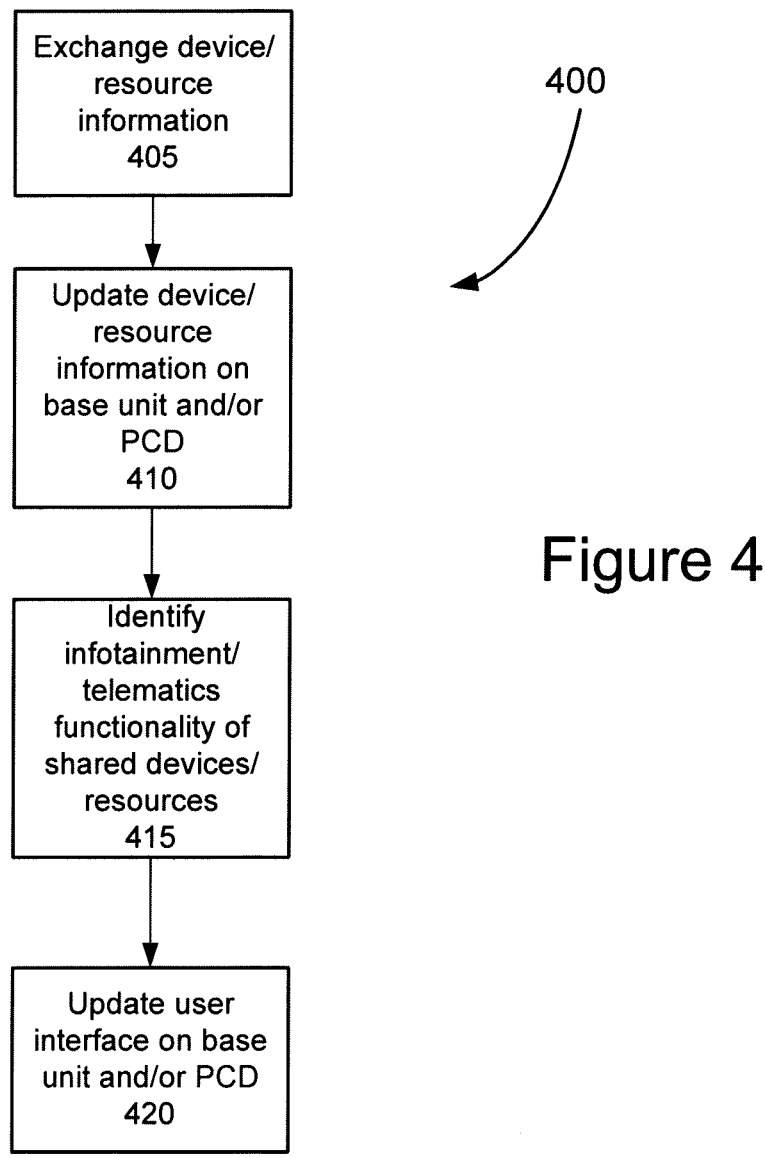
FIG. 4 shows a process that may be implemented in the system shown in FIG. 3.

FIG. 4 shows a process 400 that may be implemented in the system shown in FIG. 3. At operation 405, the base unit 205 and portable communication device 210 exchange device and/or resource information. Although a bidirectional exchange of device and/or resource information is shown in FIG. 3, a unilateral transmission of device and/or resource information may also be used. Base unit 205 may transmit information regarding its devices 220 to the portable communication device 210 without a corresponding transmission of resource information from the portable communication device 210. Once the information has been transmitted, the base unit 205 may share one or more of its devices 220 with the portable communication device 210. In such instances, the portable communication device 210 need not necessarily share its devices 250 with the base unit 205. Alternatively, the portable communication device 210 may transmit information regarding its devices 250 to the base unit 205 without a corresponding transmission of resource information from the base unit 205. Once the information has been transmitted, the portable communication device 210 may share one or more of its devices 250 with the base unit 205. In such instances, the base unit 205 need not necessarily share its devices 220 with the portable communication device 210.

The device and/or resource information on the base unit 205 and/or the portable communication device 210 is updated at operation 410. The base unit 205 may update its available device/resource information to include device/resource information received from the portable communication device 210, if any. One or more of the devices/resources may be identified by the base unit 205 as a shared device/resource. The portable communication device 210 may update its available device/resource information to include device/resource information received from the base unit 205, if any. One or more of the devices/resources may be identified by the portable communication device 210 as a shared device/resource.

At operation 415, the base unit 205 and/or the portable communication device 210 identify infotainment and/or telematics functionality of one or more of the shared devices/resources. This information may be used at operation 420 to update the user interface on one or both of the base unit 205 and/or portable communication device 210. The user interface of the base unit 205 may be updated to reflect additional infotainment and/or telematics functionality provided by shared devices/resources of the portable communication device 210. The user interface of the portable communication device 210 may be updated to reflect additional infotainment/telematics functionality provided by shared resources of the base unit 205. In either or both instances, the respective user interface may indicate the availability of the additional infotainment and/or telematics functionality and/or provide a manner through which the user may interact with, use, and/or control the additional infotainment functionality.

The user interfaces 225 and 255 of the base unit 205 and portable communication device 210, respectively, may be implemented in a number of different manners. The user interfaces may be implemented using a plug-in framework. The portable communication device 210 may send the base unit 205 one or more user interface plug-ins during the exchange at 387 that may be used by the base unit 205 to extend the user interface 225 of the base unit 205 to include access to the shared devices/resources of the portable communication device 210. Additionally, or in the alternative, the base unit 205 may send the portable communication device 210 one or more user interface plug-ins during the exchange at 387 that may be used by the portable communication device 210 to extend the user interface 255 of the portable communication device 210 to include access to the shared devices/resources of the base unit 205. The plug-ins may be stored in device/resource information storage 390 and/or device/resource information storage 393.

The user interfaces may alternatively be implemented using a browser framework in which device/resource access and control is achieved through HTML, XML, and/or other browser compatible interface. Each device/resource may have its own HTML page, XML page, or other markup language page. Additionally, or in the alternative, the user interface for one or more of the devices/resources may include a FLASH® UI (.swf) container file that includes both the graphics associated with the device/resource as well as any underlying ActionScript® programming that supports interaction with the device/resource. The FLASH UI may be accessed from the base unit 205 and/or portable communication device 210 from a FLASH player, local browser, or other runtime application. Markup language pages and/or FLASH UI for the devices/resources may be exchanged as needed on a real-time basis. Alternatively, markup language pages and/or FLASH UI for the devices/resources may be exchanged/transferred at 387. Still further, markup language pages and/or FLASH UI for the devices/resources may be obtained automatically from the Internet using a Wi-Fi connection and downloaded for use by the respective user interface of the base unit 205 and/or portable communication device 210.

Figure 5:
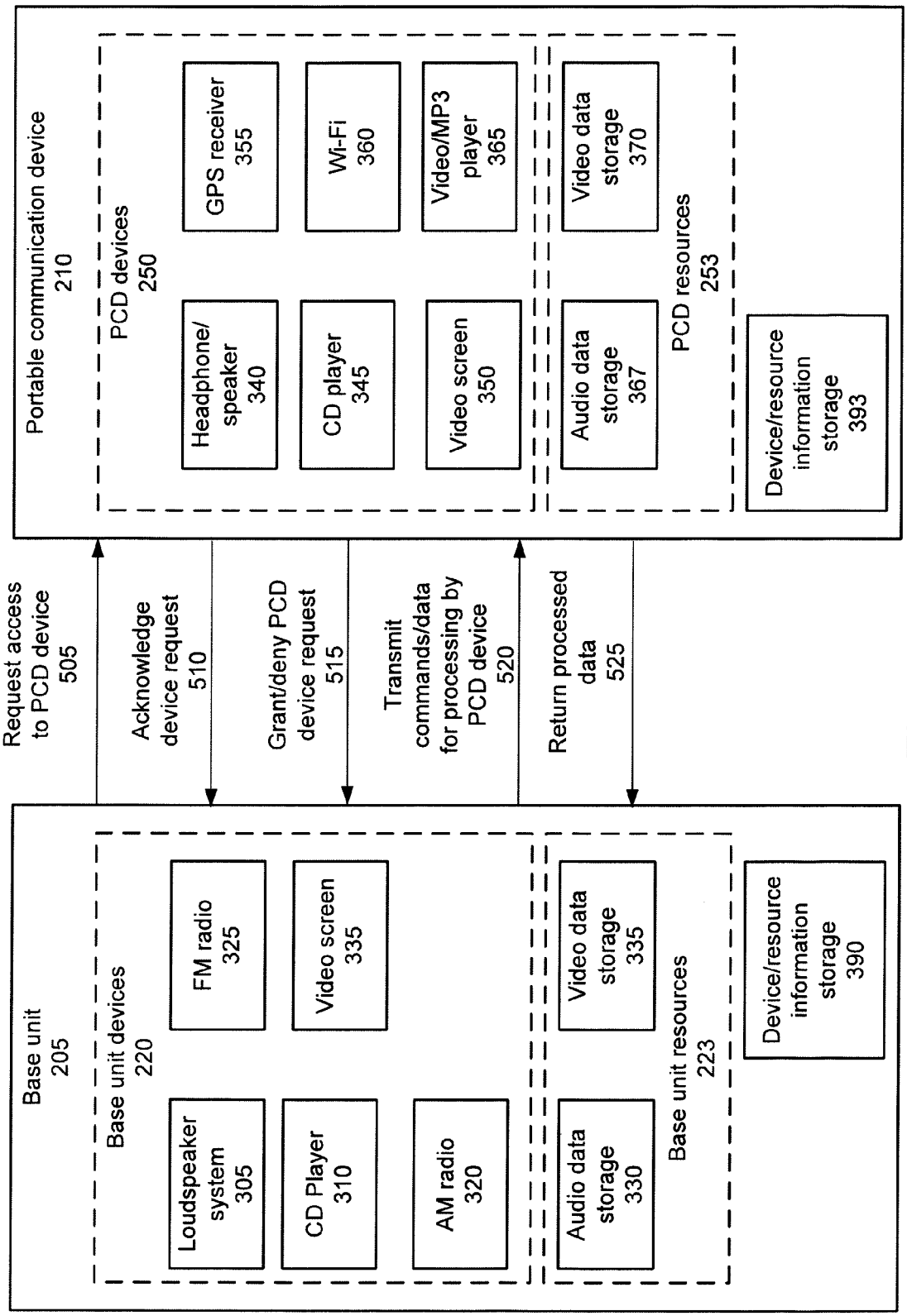
FIG. 5 shows messages that may be communicated between the base unit and portable communication device when the base unit accesses a shared device/resource on the portable communication device.

FIG. 5 shows messages that may be communicated between the base unit 205 and portable communication device 210 when the base unit 205 accesses a shared device/resource on the portable communication device 210. At 505, the base unit 205 sends a request to the portable communication device 210 for access to a device 250. The portable communication device 210 may acknowledge the device request at 510 and may grant or deny the device request at 515. If the request is denied, the base unit 205 may place the request on a queue for subsequent use. A message corresponding to the denial of the request may be provided to the user on the user interface of the base unit 205.

If the request is granted, the base unit 205 may transmit commands and/or data for processing by the requested device of the portable communication device 210 at 520. For example, the base unit 205 may request access to the decoder of the video/MP3 player 365 to decode media data stored in audio data storage resource 330. The audio data may be transmitted at 520 from the base unit 205 to the portable communication device 210 for decoding by the MP3 player 365.

The data transmitted by the base unit 205 at 520 may be processed by the requested device of the portable communication device 210 and returned for use by the base unit 205 at 525. For example, the data transmitted by the base unit 205 may be decoded by the MP3 player 365 and returned to the base unit 205 at 525. The base unit 205 may use the returned process data for playback through loudspeaker system 305.

In another case, the base unit 205 may request access to the navigation functionality available on the GPS receiver 355. A destination and request for routing information may be transmitted at 520. The GPS receiver 355 may calculate the route from, for example, the current location. In return, the portable communication device 210 may return a video stream showing the map and other navigation relevant graphics associated with the route at 525. Additionally, the portable communication device 210 may stream audio to provide audible guidance along the calculated route.

In yet another case, the base unit 205 may request access to the Wi-Fi functionality of the Wi-Fi transceiver device 360. In such instances, the base unit 205 may use the Wi-Fi transceiver device 360 as a gateway device to access the Internet, to place Internet calls, to receive and send e-mail, and to access other Internet-related functions. Commands and/or data for accessing the Internet may be provided by the base unit 205 at 520. The commands and/or data may be based on interactions between a user and the user interface 225 of the base unit 205. The processed data that is returned at 525 may be in any of a number of different formats. For example, the data may comprise TCP/IP packet data from the Internet. It may comprise audio and/or video streams processed by the portable communication device 210, where the audio and/or video streams correspond to information received by the Wi-Fi transceiver 360 in response to the commands/data sent at 520. Other manners of transferring commands and/or data between the base unit 205 and portable communication device 210 pursuant to using the Wi-Fi transceiver 360 as an Internet gateway may also be used.

The base unit 205 and portable communication device 210 may also share their respective resources 223 and 253. For simple commands like file access (audio, video, picture, etc.), UPnP and a media server approach may be used.

Figure 6:
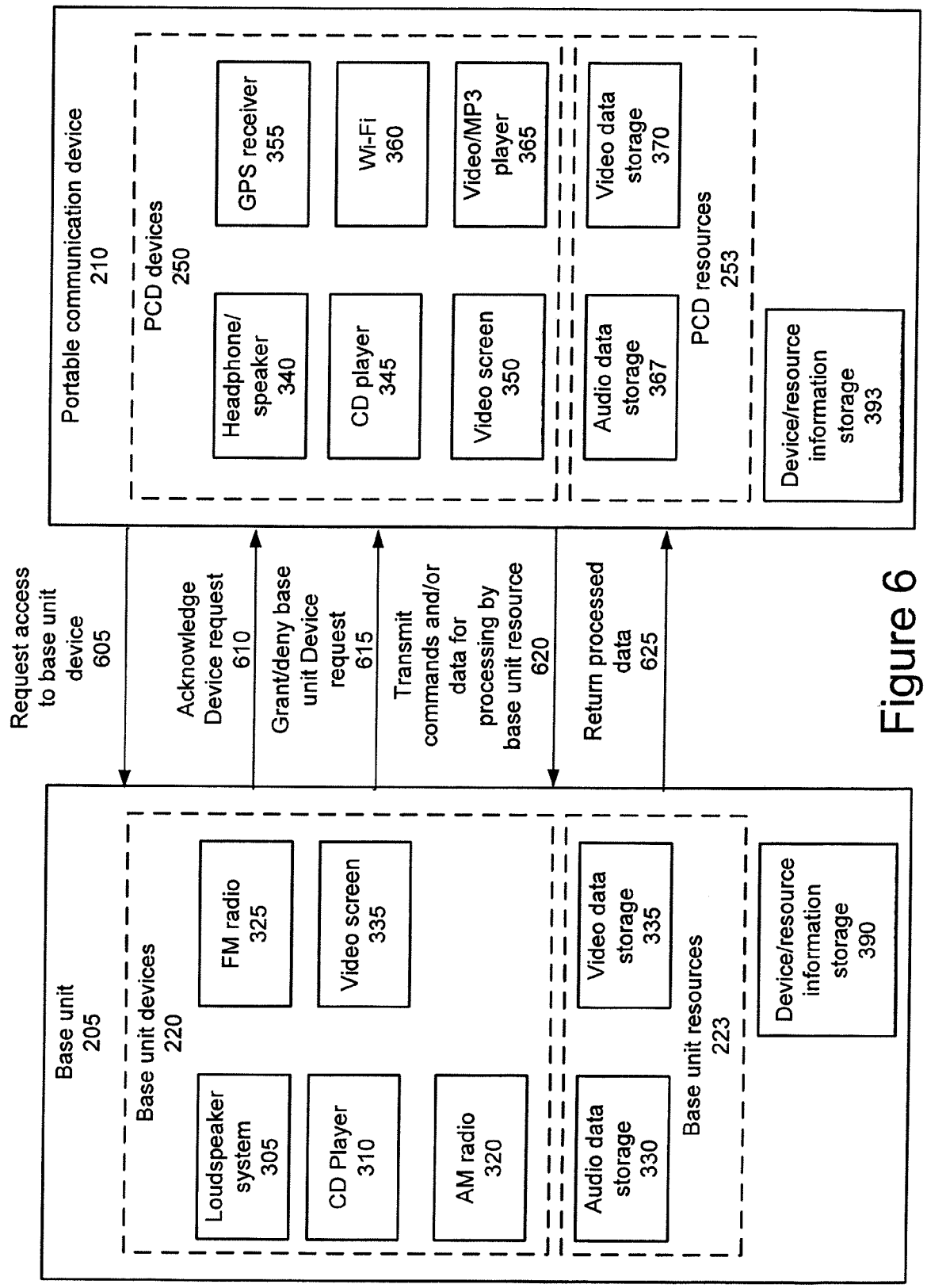
FIG. 6 shows messages that may be communicated between the base unit and portable communication device when the portable communication device accesses a shared device/resource on the base unit.

FIG. 6 shows messages that may be communicated between the base unit 205 and portable communication device 210 when the portable communication device 210 accesses a shared device/resource on the base unit 205. At 605, the portable communication device 210 sends a request to the base unit 205 for access to a device 220. The base unit 205 may acknowledge the device request at 610 and may grant or deny the device request at 615. If the request is denied, the portable communication device 210 may place the request on a queue for subsequent use. A message corresponding to the denial of the request may be provided to the user on the user interface of the portable communication device 210.

If the request is granted, the portable communication device 210 may transmit data for processing by the requested device of the base unit 205 at 620. For example, the portable communication device 210 may request access to the CD player 310. Commands to control the CD player 310 may be transmitted at 620 from the base unit 205 to the portable communication device 210.

The commands and/or data transmitted by the base unit 205 at 620 may be processed by the requested device of the base unit 205 and returned for use by the portable communication device 210 at 625. For example, streaming audio or audio packets from the CD player 310 corresponding to the commands sent at 620 may be returned to the portable communication device 210 at 625. The portable communication device 210 may use the returned data for audio playback through the headphone/speaker system 340.

When a new device/resource is attached to either the base unit 205 or portable communication device 210, either the base unit 205 or the portable communication device 210 may initiate either a bidirectional or unidirectional transmission of device/resource information. The transmission may include information relating to all of the devices/resources, including the newly added device/resource. Alternatively, the transmission may be limited to the information relating to the newly added device/resource.

Figure 7:
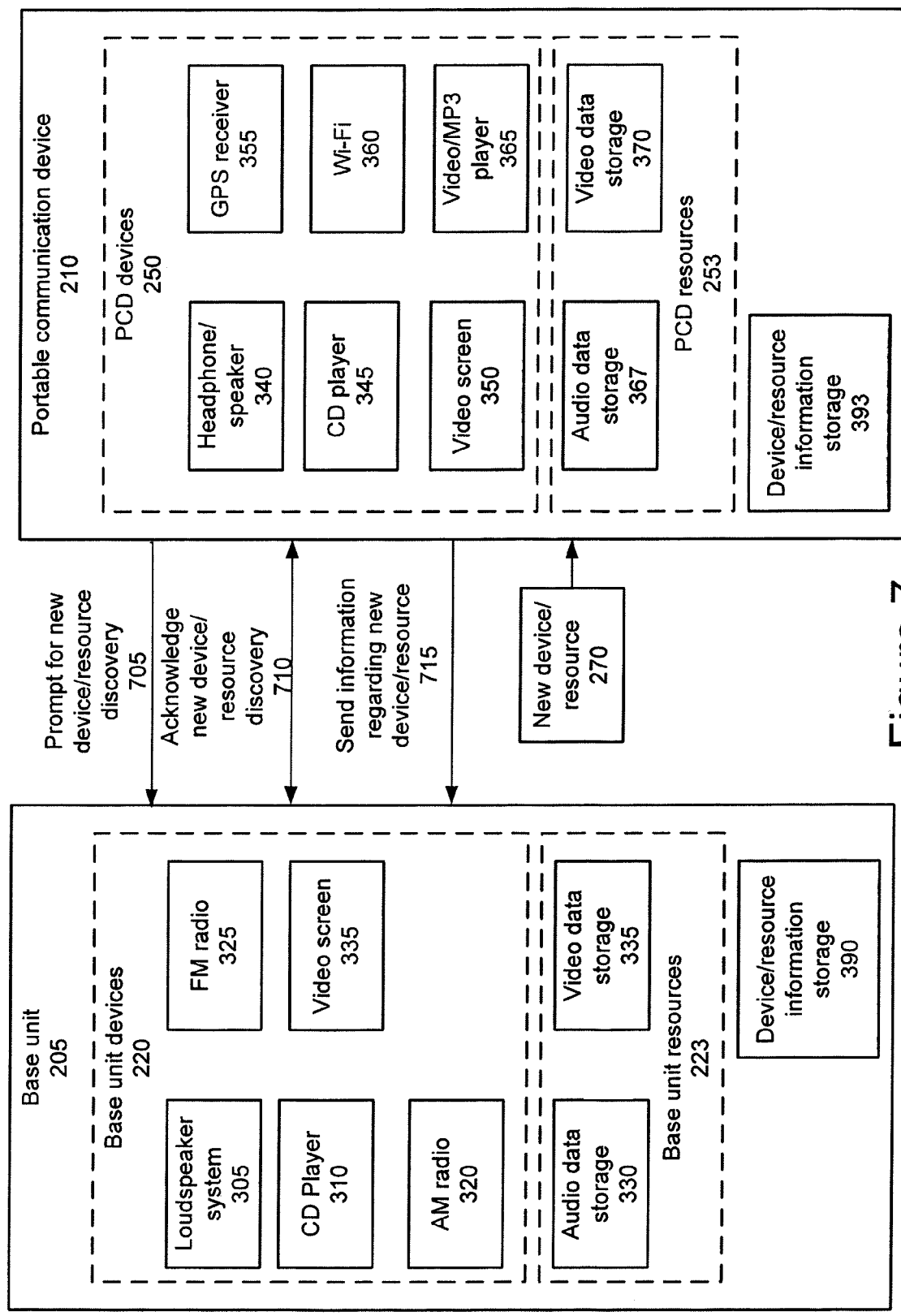
FIG. 7 shows messages that may be communicated between the base unit and portable communication device when a new device/resource is attached to the portable communication device.

FIG. 7 shows messages that may be communicated between the base unit 205 and portable communication device 210 when a new device/resource 270 is attached to the portable communication device 210. At 705, the portable communication device 210 prompts the base unit 205 to engage in a new device/resource discovery operation. Any information needed for the new device/resource discovery operation may be exchanged or acknowledged at 710. Information relating to the new device/resource 270 is transmitted to the base unit 205 at 715. The information transmitted at 715 may be based on real-time information for the new device/resource 270 and/or information stored in the device/resource information storage 393 after execution of a new device/resource discovery operation internal to the portable communication device are 210. The user interface of the base unit 205 and the user interface of the portable communication device 210 may be updated to reflect any additional infotainment and/or telematics functionality provided by the new device/resource 270.

Figure 8:
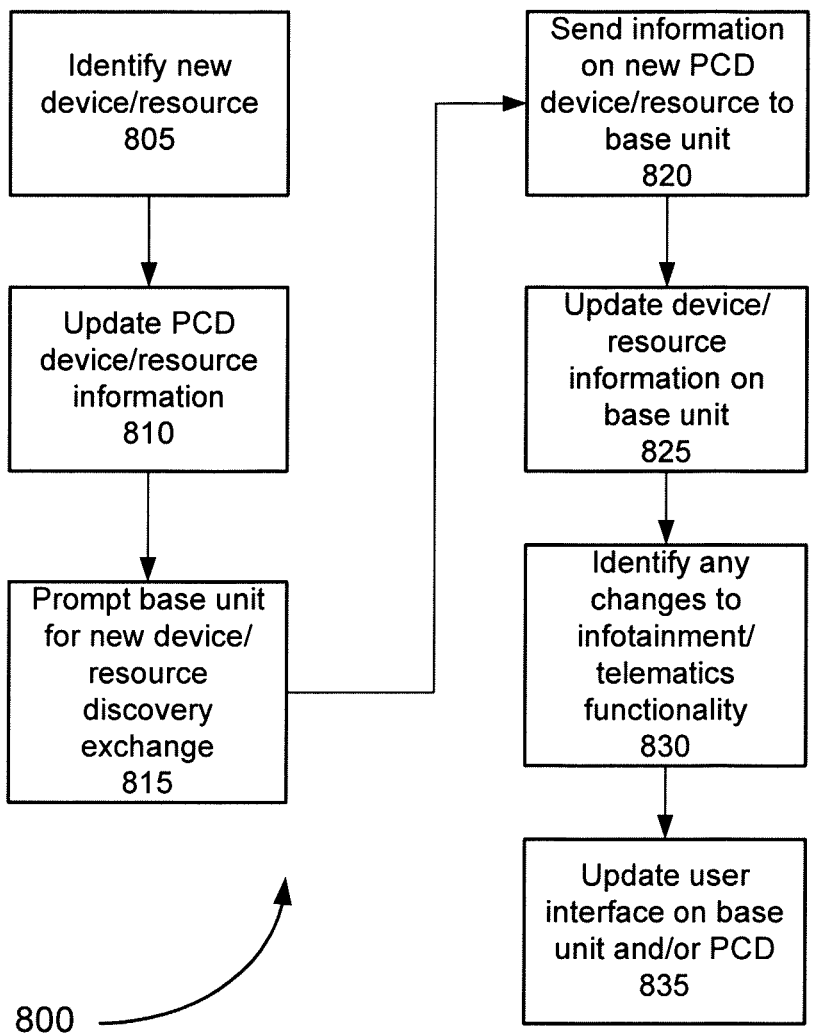
FIG. 8 shows a process that may be used when a new device/resource is attached to the portable communication device.

FIG. 8 shows a process that may be used when a new device/resource is attached to the portable communication device 210. At operation 805, the portable communication device 210 identifies the new device/resource. The portable communication device 210 updates its device/resource information at operation 810 and prompts the base unit for execution of the new device/resource discovery exchange at operation 815. At operation 820, the portable communication device 210 sends information relating to the new device/resource to the base unit 205. The base unit 205 updates its device/resource information at operation 825. The base unit 205 and portable communication device 210 identify any changes to the infotainment and/or telematics functionality resulting from the addition of the new device/resource at operation 830. At operation 835, the base unit 205 and/or portable communication device 210 update their respective user interfaces to reflect the availability of any additional infotainment/telematics functionality. One or both of the user interfaces may also be updated to allow the user to use, access, and/or control the additional infotainment/telematics functionality.

Figure 9:
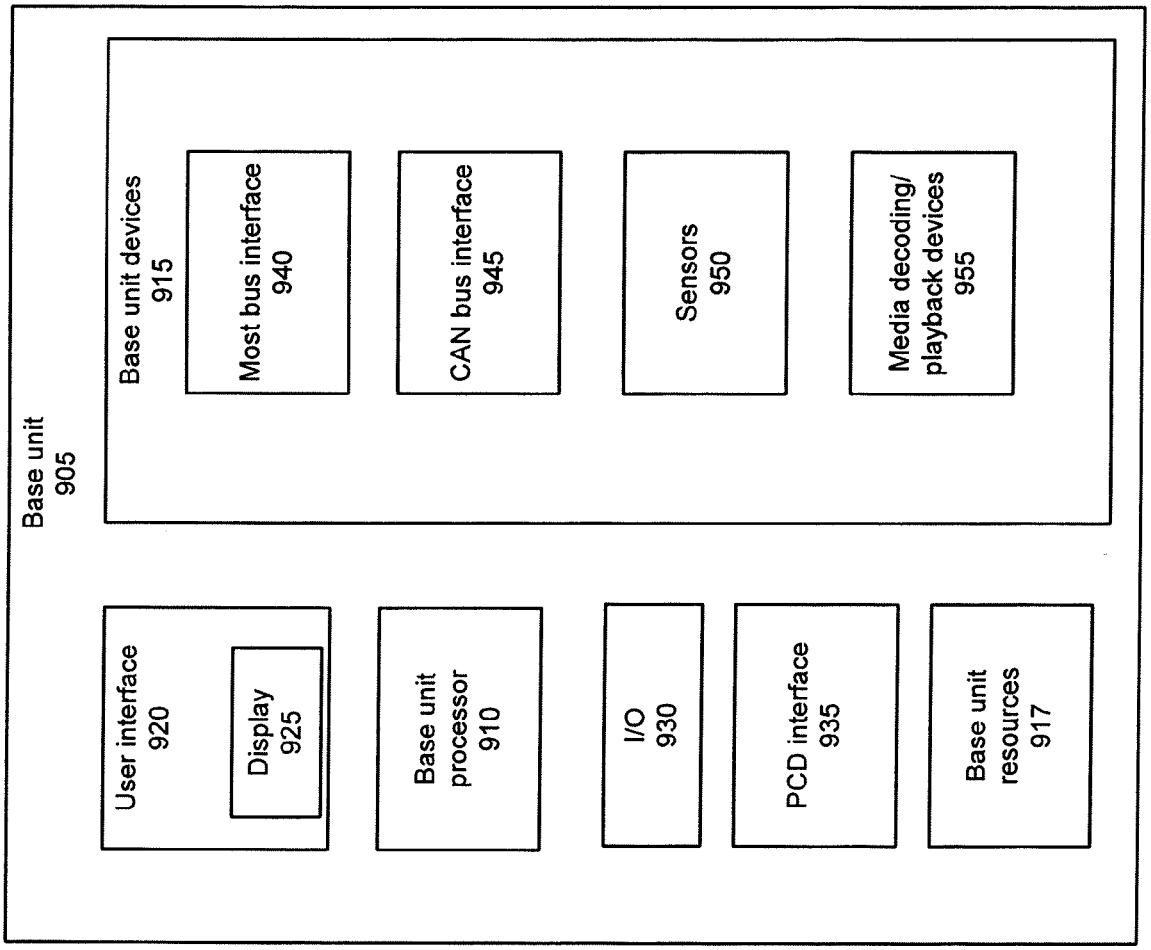
FIG. 9 is a block diagram of a base unit that may be used in a vehicle.

FIG. 9 is a block diagram of a base unit 905 that may be used in a vehicle. In FIG. 9, the base unit 905 includes a base unit processor 910 and a plurality of base unit devices 915. Additionally, the base unit 905 may include one or more base unit resources 917. The base unit processor 910, base unit devices 915, and base unit resources 917 may cooperate with one another to execute a set of infotainment and/or telematics functions associated with the base unit 905. User access to the set of infotainment/telematics functions may be provided through a user interface 920. The user interface 920 may be controlled by the base unit processor 910 and corresponding user interface software stored in memory of the base unit 905.

The user interface 920 may include virtual buttons, mechanical buttons, virtual and/or mechanical rotary controls, virtual and/or mechanical sliders, and/or a display 925. Display 925 may be used to provide visual feedback to the user, implement virtual controls, and/or may be included as one of the base unit resources 915 available in the base unit 905. Additionally, or alternatively, the user interface 920 may include components used to audibly interact with the base unit 905. Audible interaction facilitates use of speech commands and feedback through the user interface 920. Video components, such as a camera and/or video screen, may be used in the user interface to visually interact with the base unit 905. The user interface 920 may be implemented as a plug-in interface, browser interface, or using any of the interface configurations described above.

Base unit 905 may also include input/output components 930. The I/O components 930 may be used for a number of different purposes. Wi-Fi updates may be provided to the base unit 905 using the I/O components 930. Further base unit resources and resource add-ons may also be connected to the base unit 905 through the I/O components 930.

A PCD interface 935 is provided to facilitate intelligent communication over a communication link with one or more corresponding portable communication devices. The PCD interface 935 may be controlled by the base unit processor 910 and corresponding communication software. Alternatively, or in addition, the PCD interface 935 may include its own processor and corresponding communication software that controls communications between the portable communication device and the base unit processor 905.

The base unit 905 may include a wide variety of base unit devices 915. In FIG. 9, the base unit devices include: a MOST bus interface 940, a CAN bus interface 945, one or more sensors 950, and media decoding/playback resources 955. The MOST interface 940 (Media Oriented Systems Transport) allows the base unit 905 to interface with devices compliant with the multimedia and infotainment networking standard in the automotive industry. The CAN bus interface 945 allows the base unit 905 to interface with the engine and/or comfort CAN system used in the vehicle. Sensors 950 may include vehicle sensors that are not provided on or accessible over the CAN bus. The media storage/decoding/playback resources 955 may include media resources that are not available over the MOST bus of the vehicle, or otherwise not provided in other portions of the vehicle.

Figure 10:
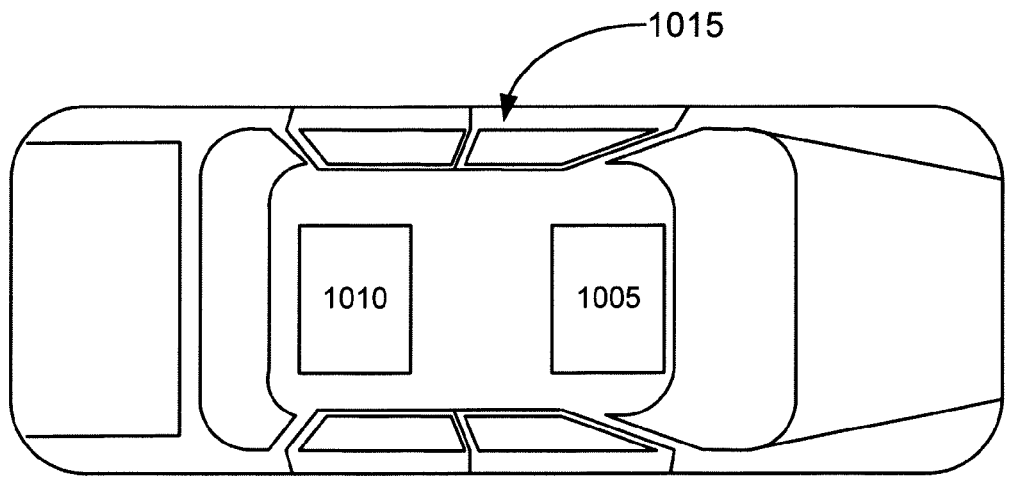
FIG. 10 illustrates one manner of physically orienting a fixed base unit and corresponding portable communication device in a vehicle.

FIG. 10 illustrates one manner of physically orienting a fixed base unit 1005 and corresponding portable communication device 1010 in a vehicle 1015. In FIG. 10, the base unit 1005 may be fixed for access by a driver in the passenger compartment. Such access may be provided when the base unit 1005 is mounted in or on the dashboard of the vehicle 1015. The portable communication device 1010 may be in the form of a handheld unit that is held and operated by a passenger in the passenger compartment. Alternatively, or in addition, the portable communication device 1010 may be mounted in a corresponding adapter/socket disposed in the rear passenger compartment of the vehicle 1015. For example, the portable communication device 1010 may be mounted in a corresponding adapter and/or socket disposed in a rear portion of a front seat of the vehicle.

Figure 11:
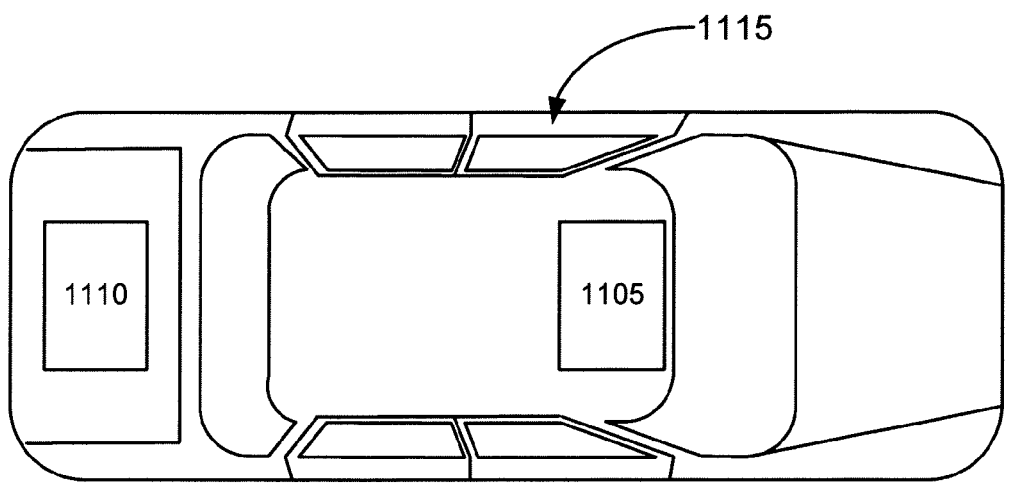
FIG. 11 illustrates a further manner of physically orienting a fixed base unit and corresponding portable communication device in a vehicle.

FIG. 11 illustrates another manner of physically orienting a fixed base unit 1105 and corresponding portable communication device 1110 in a vehicle 1115. In FIG. 11, the base unit 1105 may be fixed for access by a driver in the passenger compartment. Such access may be provided when the base unit 1105 is mounted in or on the dashboard of the vehicle 1115. The portable communication device 1110 may be in the form of a handheld unit that is readily placed for operation in the trunk compartment of the vehicle 1115. Alternatively, or in addition, the portable communication device 1110 may be mounted in a corresponding adapter/socket disposed in the trunk of the vehicle 1115.

Figure 12:
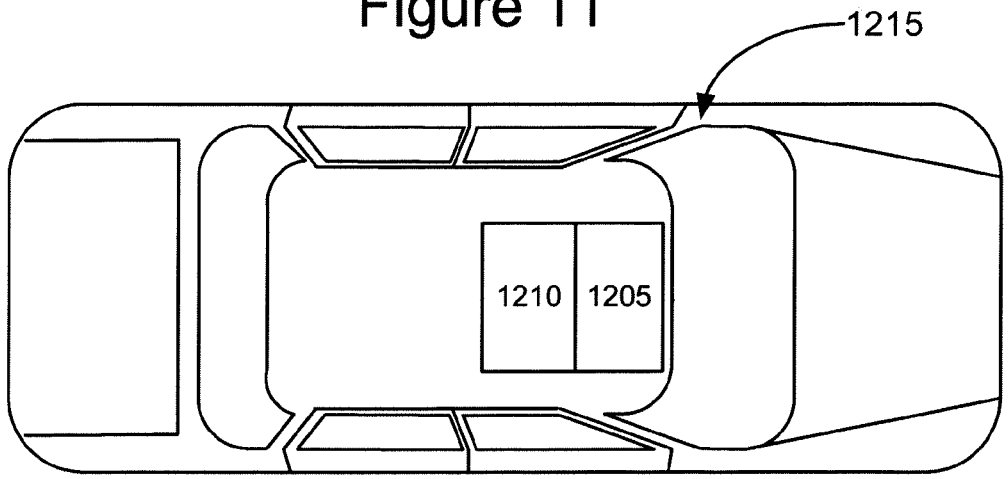
FIG. 12 illustrates a still further manner of physically orienting a fixed base unit and corresponding portable communication device in a vehicle.

FIG. 12 illustrates a still further manner of physically orienting a fixed base unit 1205 and corresponding portable communication device 1210 in a vehicle 1215. In FIG. 12, the base unit 1205 may be fixed for access by a driver in the passenger compartment. Such access may be provided when the base unit 1205 is mounted in or on the dashboard of the vehicle 1215. The portable communication device 1210 may be in the form of a handheld unit that is readily joined for operation with the base unit 1205 in the front passenger compartment of the vehicle 1215. This may be accomplished by providing mating connectors between the base unit 1205 and the portable communication device 1210. Alternatively, or in addition, this may be accomplished by providing a dedicated adapter and/or socket in the dashboard, glove compartment, or other location in the front portion of the passenger compartment of the vehicle 1215.

Figure 13:
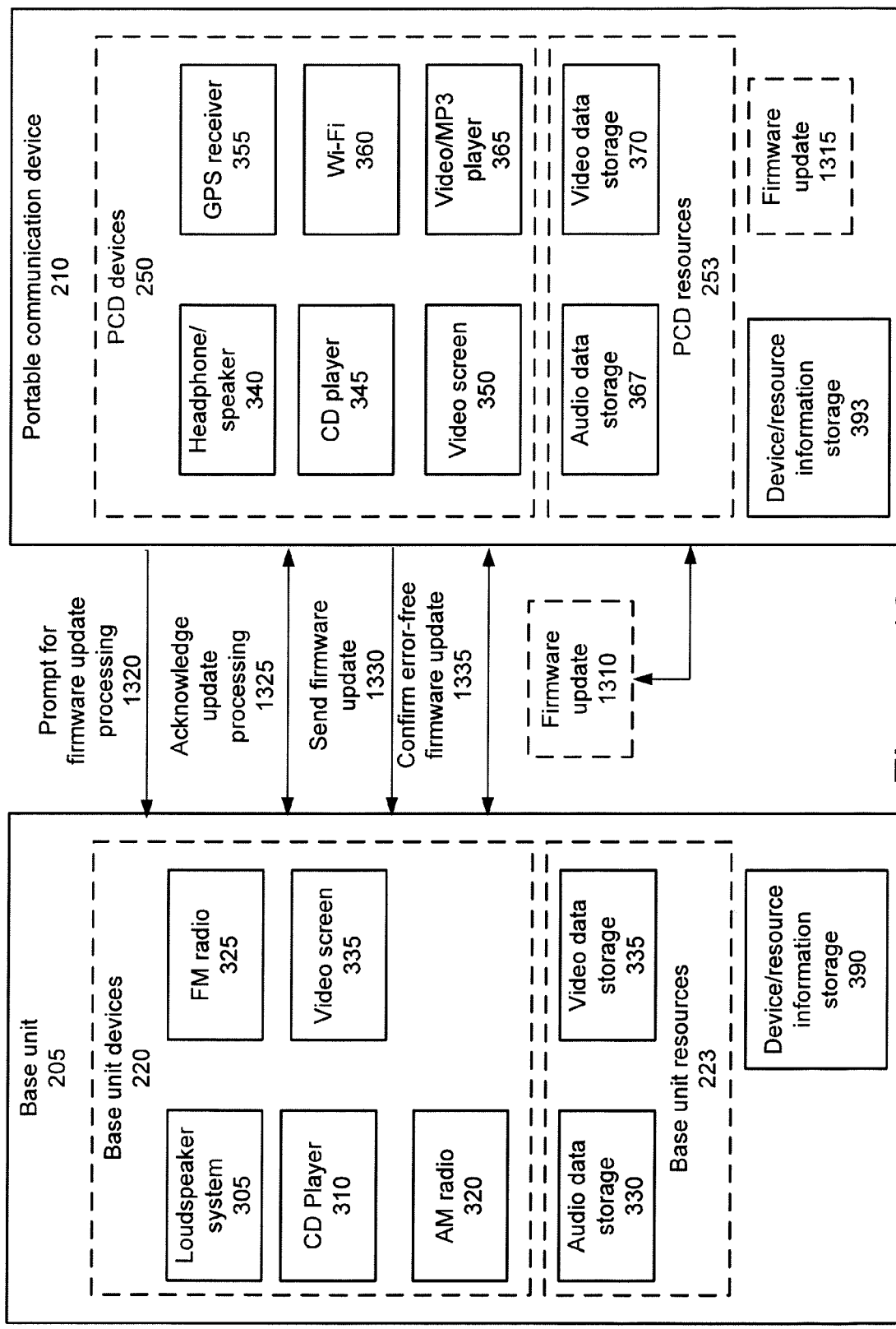
FIG. 13 shows how the portable communication device may be used to update firmware in the base unit.

FIG. 13 shows how the portable communication device 210 may be used to update firmware in the base unit 205. In FIG. 13, base unit firmware 1305 may be stored in non-volatile storage. The updated firmware and any information needed to update the base unit firmware may be included as a resource of the portable communication device 210. Here, two options are shown. Firmware update 1310 may be stored in memory that is connected to the portable communication device 210 as a transient resource over the I/O components 265. The firmware update 1310 may be downloaded into the memory device from an external source, such as computer 135. Firmware update 1315 may be stored in memory that is fixed in the portable communication device 210. The firmware update 1315 may be obtained by the portable communication device 210 from an external source, such as Wi-Fi connection 130 or computer 135. Other manners of acquiring and storing a firmware update in the portable communication device 210 may also be used.

FIG. 13 also shows the types of messages that may be communicated pursuant to upgrading the base unit firmware 1305. At 1320, the portable communication device 210 prompts the base unit 205 to begin the execution of a firmware upgrade process. Acknowledgments and other initial information may be passed between the base unit 205 and portable communication device 210 at 1325. Such information may include the version number of the firmware update, the creation date of the firmware update, error correction codes, checksums, and any other information that may be used by the base unit 205 during the firmware update process. If the version number and/or creation date of the firmware update match the base unit firmware 1305 that is currently installed on the base unit 205, the base unit 205 may communicate this to the portable communication device 210. In such instances, the portable communication device 210 may record this fact and refrain from further attempts at updating the firmware 1305 of this particular base unit 205.

If the acknowledgments and information exchanged at 1325 indicate that the base unit 205 is ready to proceed with the firmware update, the portable communication device 210 sends a firmware update at 1330. The data for the firmware update may be sent as a single stream or in packets, each packet being acknowledged by the base unit 205.

Once the portable communication device 210 has transferred all information and data for the firmware update to the base unit 205, the portable communication device 210 and the base unit 205 may confirm that the firmware update occurred without any errors at 1335. If errors occurred, it may be necessary to repeat all or a portion of the firmware update process. If the firmware update is error-free, a software reset of the base unit 205 may be executed so that the base unit 205 may operate with the updated base unit firmware 1305.

The operations shown in FIG. 13 may be extended to other situations in which the portable communication device 210 updates the base unit 205. For example, audio and/or video decoding software may be added to the devices 220 of the base unit 205 using the portable communication device 210. Such decoding software may also be updated on the base unit 205 using the portable communication device 210. Software used by an existing resource, such as CD player 310, may also be updated using operations similar to those shown in FIG. 13.

The base unit 205 and portable communication device 210 may include software and/or hardware used to manage the distribution of infotainment and/or telematics functionality between them. For example, base unit 205 may be assigned infotainment/telematics functionalities associated with a first playback zone while portable communication device 210 may be assigned infotainment/telematics functionalities associated with a second playback zone. Other manners of distributing the functionality of the base unit 205 and portable communication device 210 are shown in FIGS. 14 and 15.

Figure 14:
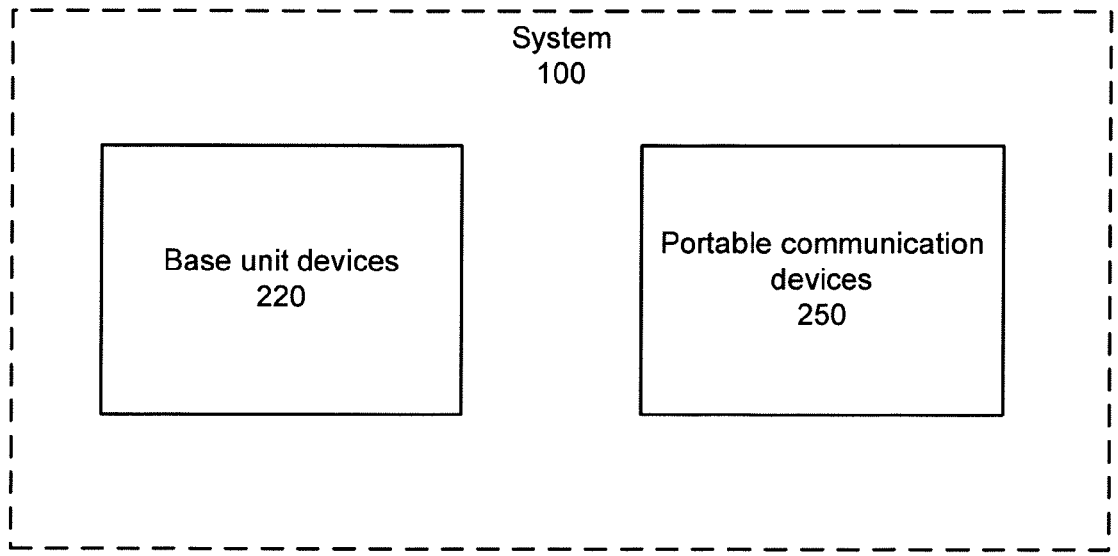
FIG. 14 shows a system in which the base unit device types and portable communication device infotainment/telematics device types do not overlap with one another.

In FIG. 14, the system 100 includes a set of base unit devices 220 associated with a first set of infotainment and/or telematics functions and a second set of PCD devices 250 associated with a second set of infotainment and/or telematics functions. The base unit devices 220 and PCD devices 250 include differing types of resources. The first and second sets of infotainment/telematics functions shown in FIG. 14 may be non-overlapping. The base unit devices 220 may be assigned to execute infotainment/telematics functionality for the base unit 205 while the PCD devices 250 may be assigned to execute infotainment/telematics functionality for the portable communication device 210. Device/resource sharing need not necessarily be executed.

Alternatively, device sharing may be fully executed in the system 100 of FIG. 14. In such instances, all of the functionality associated with the base unit devices 220 may be made available to the portable communication device 210 while all of the functionality associated with the PCD devices 250 may be made available to the base unit 205. Still further, a limited number of base unit devices 220 may be made available to the portable communication device 210. Similarly, a limited number of PCD devices 250 may be made available to the base unit 210.

Figure 15:
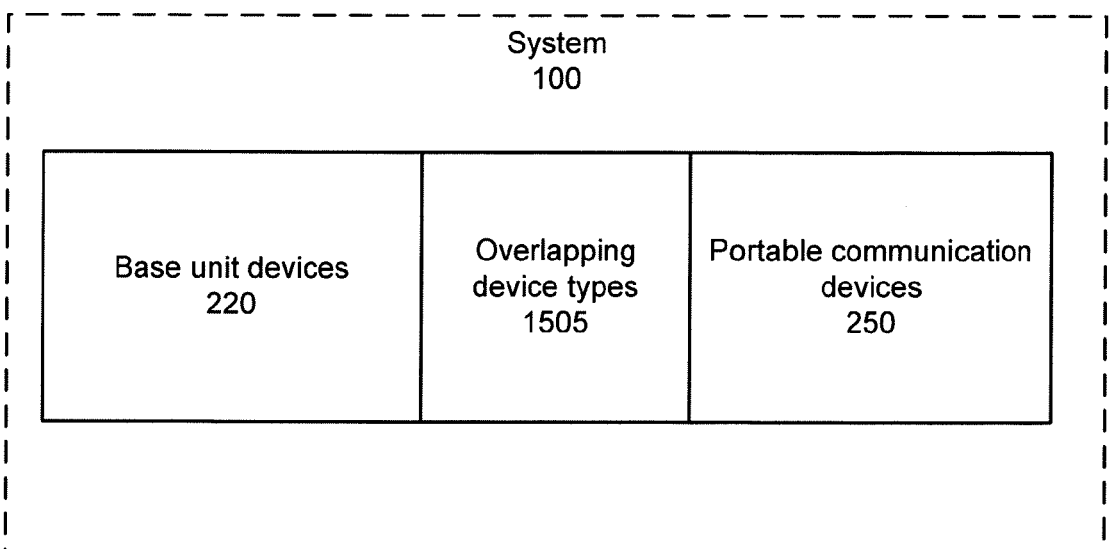
FIG. 15 shows a system in which the base unit device types and portable communication device infotainment/telematics device types overlap with one another.

In FIG. 15, the system 100 includes a set of base unit devices 220 associated with a first set of infotainment and/or telematics functions and a second set of PCD devices 250 associated with a second set of infotainment and/or telematics functions. The base unit devices 220 and PCD devices 250 include one or more overlapping resource types 1505. The portable communication device 210 may have more processing power than the base unit 205. In such instances, when the base unit 205 and portable communication device 210 are connected for communication with one another, the system 100 may shift any overlapping functionality associated with the overlapping device types 1505 to the portable communication device 210. In other instances, the base unit 205 may have more processing power than the portable communication device 210. In such instances, when the base unit 205 and portable communication device 210 are connected for communication with one another, the system 100 may shift any overlapping functionality associated with the overlapping device types 1505 to the base unit 205. Still further, such shifting may be executed independent of the processing power of the base unit 205 and/or portable communication device 210.

Figure 16:
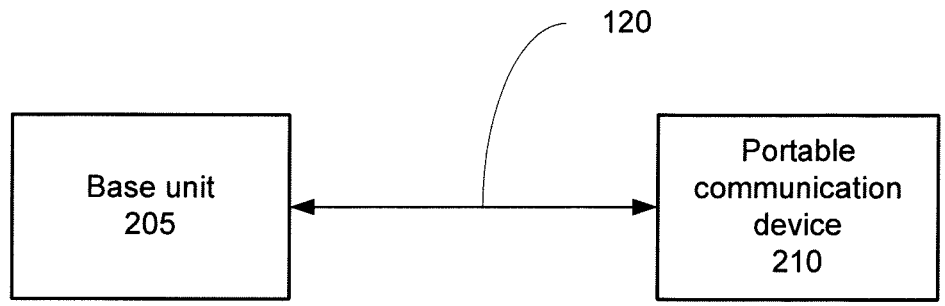
FIG. 16 shows a single portable communication device connected to a single base unit over communication link.
Figure 17:
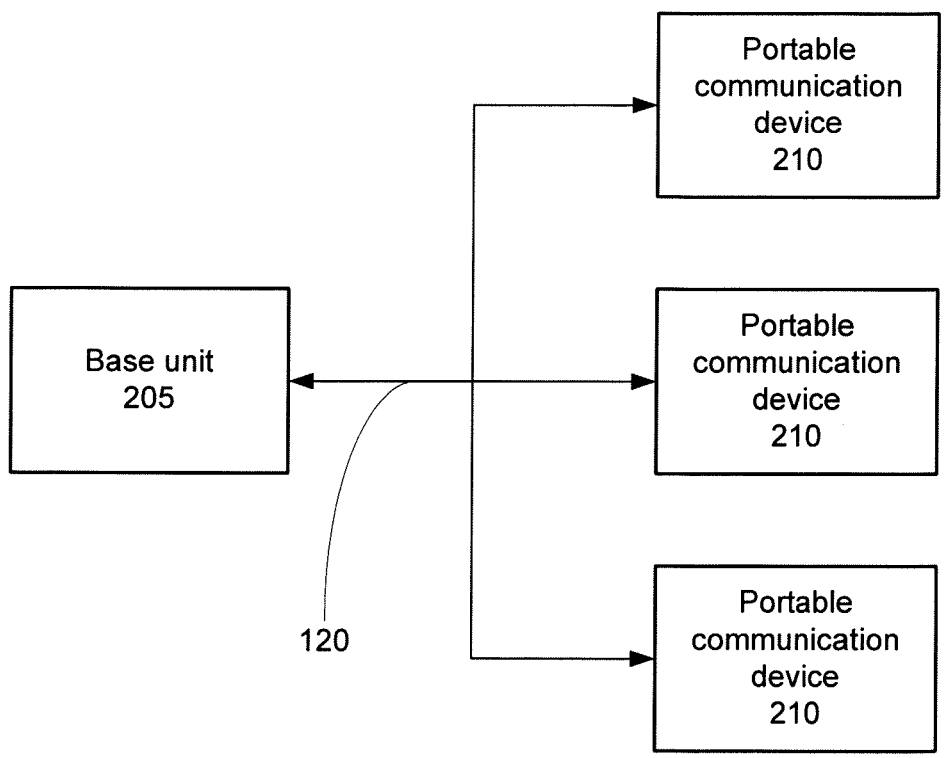
FIG. 17 shows multiple portable communication devices connected for intelligent communication to a single base unit.

System 100 may be configured in a number of different manners. In FIG. 16, a single portable communication device 210 is connected to a single base unit 205 over communication link 120. Multiple portable communication devices may also be employed. FIG. 17 shows multiple portable communication devices 210 connected for intelligent communication to a single base unit 205. In this configuration, each portable communication device 210 may communicate independently with the base unit 205. The base unit 205 may act as a network server for the portable communication devices 210. Devices/resources on one of the portable communication devices 210 may be shared with another portable communication device 210 connected to the base unit 205.

Device/resource sharing and infotainment/telematics functionality distribution may be handled by the base unit 205. The base unit 205 may act as a communication hub for the multiple portable communication devices 210. Alternatively, the portable communication devices 210 and the base unit number 205 may communicate with one another in a peer-to-peer manner.

Figure 18:
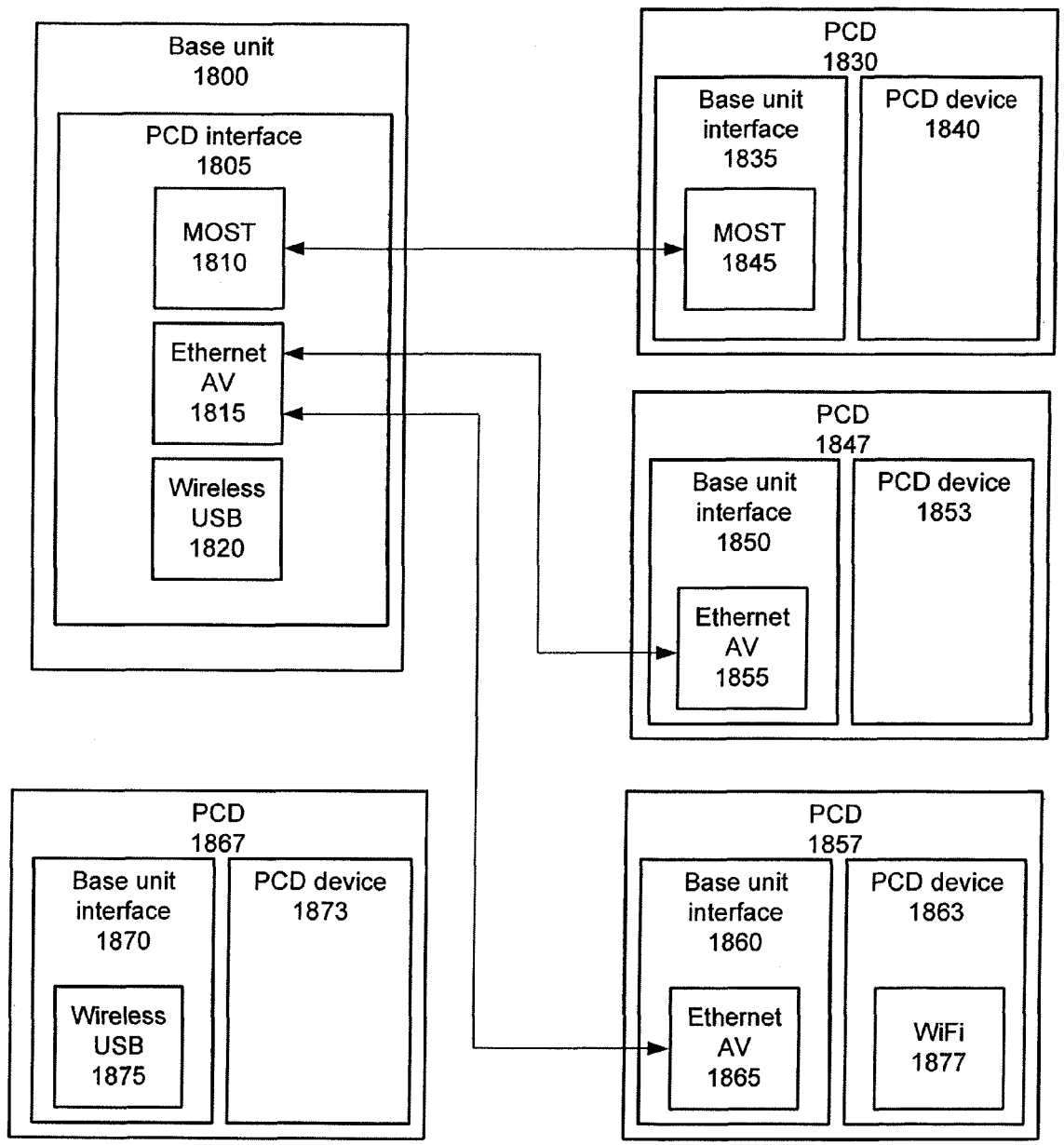
FIG. 18 shows multiple portable communication devices connected for intelligent communication to a base unit using both wired and wireless communication layers.

FIG. 18 illustrates how a base unit 1800 may be connected to multiple portable communication devices. Base unit 1800 includes a PCD interface 1805 that provides intelligent communication with the multiple portable communication devices. The PCD interface 1805 may include interfaces compliant with different communication standards. In FIG. 18, the PCD interface 1805 includes both a wired layer and a wireless layer. The wired layer of FIG. 18 includes a MOST interface 1810 and/or an Ethernet AV interface 1815. In addition to providing a medium for communication, the wired layer may also be configured to provide power to one or more portable communication devices. The wireless layer may be a combination of Wi-Fi and ultra-wideband technology (UWB). In FIG. 18, the wireless layer may be implemented as a wireless USB interface 1820.

FIG. 18 shows multiple portable communication devices connected to the PCD interface 1805. Portable communication device 1830 includes a base unit interface 1835 having a MOST interface 1845 for communication with the MOST interface 1810 of the PCD interface 1805. The portable communication device 1830 may share PCD device 1840 with the base unit 1800 using this communication link.

Portable communication device 1847 includes a base unit interface 1850 having an Ethernet AV interface 1855 for communication with the Ethernet AV interface 1815 of the PCD interface 1805. The portable communication device 1847 may share PCD device 1853 with the base unit 1800 using this communication link. Similarly, portable communication device 1857 includes a base unit interface 1860 having an Ethernet AV interface 1865 for communication with the Ethernet AV interface 1815 of the PCD interface 1805. The portable communication device 1857 may share PCD device 1853 with the base unit 1800 using this communication link. This configuration may operate in an ad hoc manner that allows direct communication and sharing of PCD devices between portable communication device 1847 and portable communication device 1857. Alternatively, base unit 1800 may operate as a communication hub that arbitrates communication and/or device sharing between portable communication device 1847 and portable communication device 1857.

Portable communication device 1867 includes a base unit interface 1870 having a wireless USB interface 1875 for communication with the wireless USB interface 1820 of the PCD interface 1805. The portable communication device 1867 may share PCD device 1875 with the base unit 1800.

Base unit 1800 may operate as a communication hub that arbitrates communication and/or device sharing between devices using different interface standards. In FIG. 18, PCD device 1863 of portable communication device 1857 includes a Wi-Fi transceiver 1877. Base unit 1800 may use the Wi-Fi transceiver 1877 as an Internet gateway and, further, make the gateway available to one or more of the other portable communication devices 1830, 1847, and 1867. Other base unit devices and PCD devices may also be shared in a similar manner.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
    a fixed base unit comprising a base unit processor and a base unit user interface, where the fixed base unit includes a plurality of base unit devices cooperating with the base unit processor to execute a set of stand-alone infotainment and/or telematics functions;
    a portable communication device ("PCD") comprising PCD processor and a PCD user interface, where the PCD further includes a PCD device cooperating with the PCD processor to execute a stand-alone infotainment and/or telematics function of the PCD; and
    where the fixed base unit and the PCD are connected for intelligent communication with one another, the PCD is configured to forward to the fixed base unit, identification information regarding the PCD device in response to the fixed base unit and the PCD being connected for the intelligent communication, and where the fixed base unit is configured to control and access the PCD device in order to execute the stand-alone infotainment and/or telematics function of the PCD.

2. The system of claim 1, where the PCD device comprises a global positioning system ("GPS") receiver, and where the fixed base unit is configured to control and access the GPS receiver when the fixed base unit and the PCD are connected for intelligent communication with one another.

3. The system of claim 1, where the PCD device comprises a Wi-Fi transceiver, and where the fixed base unit may use the Wi-Fi transceiver as an internet gateway when the fixed base unit and the PCD are connected for the intelligent communication with one another.

4. The system of claim 1, where the base unit user interface comprises browser interface access to the stand-alone infotainment/telematics function of the PCD.

5. The system of claim 1, where the base unit user interface comprises plug-in interface access to the stand-alone infotainment/telematics function of the PCD.

6. The system of claim 1, where the fixed base unit is fixed in the vehicle.

7. A system comprising:
   a fixed base unit adapted to execute a set of stand-alone infotainment and/or telematics functions;
   a portable communication device adapted to execute a stand-alone infotainment and/or telematics function; and
   where the portable communication device is configured to send to the fixed base unit identity of a coupled device in response to the fixed base unit and the portable communication device being connected for intelligent communication with one another and the fixed base unit is configured to control and access the stand-alone infotainment and/or telematics function of the portable communication device by control and access of the coupled device.

8. The system of claim 7, where the coupled device comprises a global positioning system ("GPS") receiver, and where the fixed base unit is configured to control and access the GPS receiver when the fixed base unit and the portable communication device are connected for intelligent communication with one another.

9. The system of claim 8, where the fixed base unit is configured to communicate commands and data to the portable communication device for use in control of the GPS receiver.

10. The system of claim 9, where the portable communication device is configured to stream map video to the fixed base unit in response to the commands and data received from the fixed base unit.

11. The system of claim 9, where the portable communication device is configured to stream audio to the fixed base unit in response to the commands and data received from the fixed base unit.

12. The system of claim 7, where the coupled device comprises a Wi-Fi transceiver, and where the fixed base unit is configured to use the Wi-Fi transceiver as an Internet gateway when the fixed base unit and the portable communication device are connected for intelligent communication with one another.

13. The system of claim 7, where the portable communication device and the fixed base unit each comprise a user interface, and where the user interface of the fixed base unit and the user interface of the portable communication device each comprise a display.

14. The system of claim 7, where the portable communication device and the fixed base unit each comprise a user interface, and where the user interface of the fixed base unit comprises browser interface access to the stand-alone infotainment/telematics function of the portable communication device.

15. The system of claim 7, where the portable communication device and the fixed base unit each comprise a user interface, and where the user interface of the fixed base unit comprises plug-in interface access to the stand-alone infotainment/telematics function of the portable communication device.

16. The system of claim 7, where the portable communication device is configured to communicate decoded media data to the fixed base unit for playback in response to commands provided by the fixed base unit to the portable communication device.

17. A system comprising:
   fixed base means for executing a set of stand-alone infotainment and/or telematics functions;
   portable communication means for executing a stand-alone infotainment and/or telematics function by a device coupled with the portable communication means; and
   where the portable communication means is configured for sending to the fixed base means identification of the device when the fixed base means and the portable communication means are connected for intelligent communication with one another and where the fixed base means is configured for controlling and accessing the stand-alone infotainment and/or telematics function of the portable communication means by controlling and accessing the device.

18. The system of claim 17, where the device comprises a global positioning system ("GPS") receiver, and where the fixed base means is configured to control and access the GPS receiver when the fixed base means and the portable communication means are connected for intelligent communication with one another.

19. The system of claim 18, where the fixed base means is configured to communicate commands and data to the portable communication means for use in control of the GPS receiver.

20. The system of claim 19, where the portable communication means is configured to stream map video to the fixed base means in response to the commands and data received from the fixed base means.

21. The system of claim 20, where the portable communication means is configured to stream audio to the fixed base means in response to commands and data received from the fixed base means.

22. The system of claim 17 where the device comprises a Wi-Fi transceiver, and where the fixed base means is configured to use the Wi-Fi transceiver as an Internet gateway when the fixed base means and the portable communication means are connected for intelligent communication with one another.

23. A method for operating an infotainment/telematics system comprising:
   executing a set of stand-alone infotainment and/or telematics functions using a fixed base unit;
   executing a stand-alone infotainment and/or telematics function using a portable communication device with a resource; and
   sending, by the portable communication device to the fixed base unit, identification information of the resource via intelligent communication; and
   controlling, by the fixed base unit, the standalone infotainment and/or telematics function of the portable communication device by accessing the resource of the portable communication device based on the identification information.

24. The method of claim 23, further comprising:
   providing global positioning system ("GPS") functionality as the stand-alone infotainment and/or telematics function of the portable communication device; and controlling the GPS functionality by the fixed base unit when the portable communication device and the fixed base unit are connected for intelligent communication with one another.

25. The method of claim 24, further comprising streaming map video from the portable communication device to the fixed base unit in response to commands and data received from the fixed base unit at the portable communication device.

26. The method of claim 23, further comprising:
providing Wi-Fi functionality as the stand-alone infotainment and/or telematics function of the portable communication device;
controlling, by the fixed base unit the Wi-Fi functionality and using the portable communications device as an Internet gateway when the fixed base unit and the portable communication device are connected for intelligent communication with one another.

27. The system of claim 1, where the fixed base unit is configured to forward to the PCD, identification information of at least one of the base unit devices in response to the fixed base unit and the PCD being connected for the intelligent communication, and where the PCD is further configured to control and access the at least one of the base unit devices to execute at least one of the respective stand-alone infotainment and/or telematics functions of the fixed base unit corresponding to the at least one of the base unit devices.

28. The system of claim 7, where the coupled device is a transient device and the portable communication device is configured to send identity information of the transient device to the fixed base unit in response to the transient device being coupled to the portable communication device.

29. The method of claim 23, where the resource is a temporary resource, the method further comprising:
identifying, by the portable communication device, the temporary resource in response to the temporary resource being connected to the portable communication device; and
sending, by the portable communication device to the fixed base unit, indication of absence of the temporary resource, in response to the temporary resource being disconnected from the portable communication device.

* * * * *